Patented July 31, 1928.

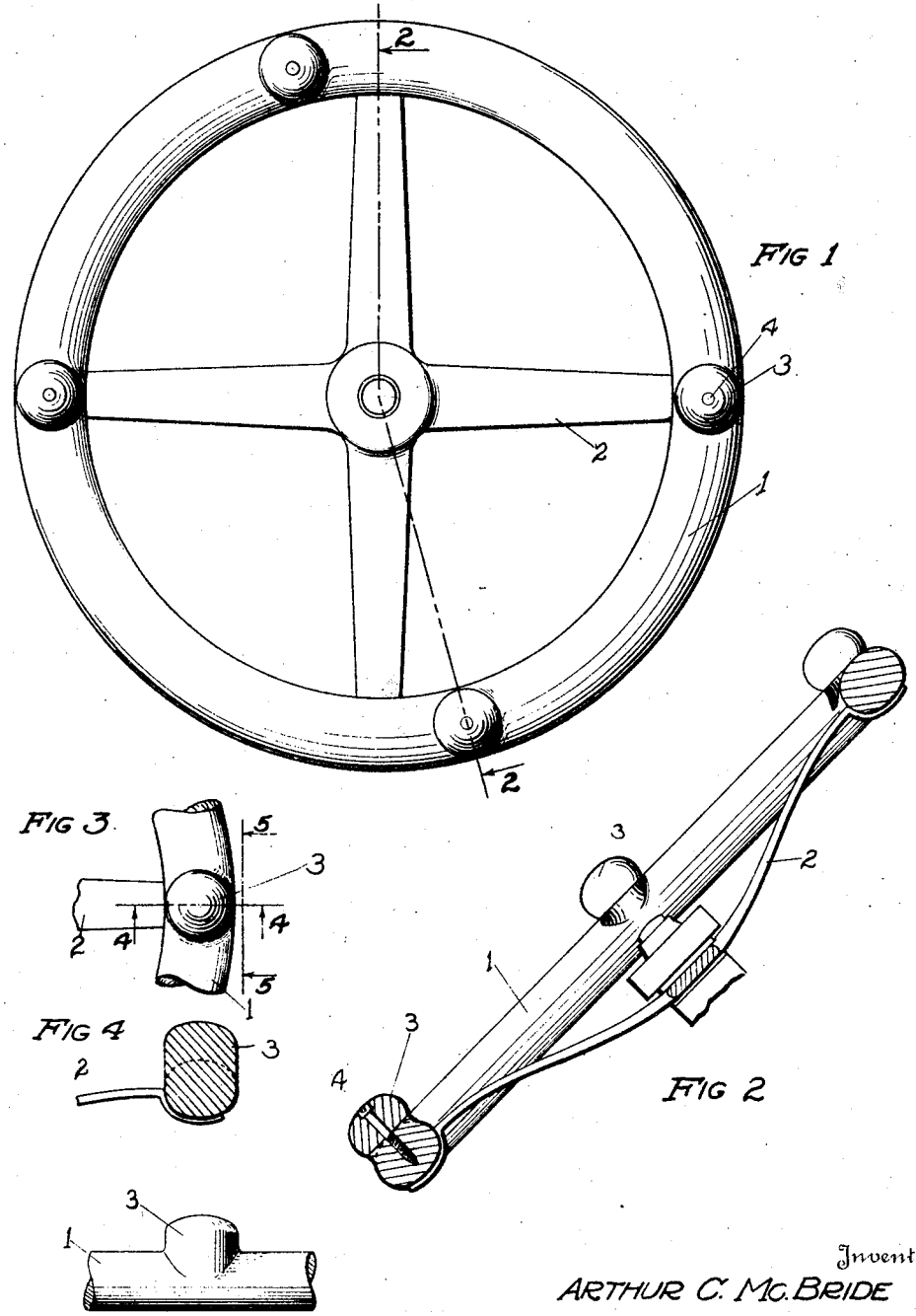

1,679,164

UNITED STATES PATENT OFFICE.

ARTHUR C. McBRIDE, OF SAN DIEGO, CALIFORNIA.

VEHICLE STEERING WHEEL.

Application filed June 2, 1925. Serial No. 34,315.

My invention relates to vehicle steering wheels, particularly to means in connection with vehicle steering wheels to facilitate the handling thereof, and the objects of my invention are: first, to provide knob means in connection with vehicle steering wheels at the side thereof nearest the driver over which the hollow portion of the hand of the driver may be placed or rest to facilitate the handling of the wheel without necessitating gripping the annular or rim portion of the wheel, and whereby the wheel may be completely turned around about its axis without removing the hand from the knob means and still retain the hand in such a position relatively thereto that the annular portion or rim of the wheel may be readily gripped if desired; second, to provide a vehicle steering wheel having one or a plurality of flat knob members at the upper side thereof, or the side thereof nearest the driver, which knob members may be either revolubly mounted on the rim of the wheel so that the same may rotate with the hand relatively to the wheel, or may form an integral part of the rim of the wheel; third, to provide a plurality of flat knob members at the upper side of a vehicle steering wheel which are so arranged relatively thereto as to meet the requirement and convenience of all drivers; fourth, to provide as a whole a novelly constucted vehicle steering wheel, and fifth, to provide a vehicle steering wheel of this class which is simple and economical of construction, durable, practical, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a front or top view of a vehicle steering wheel as commonly used on automobiles, with my knob means provided at the upper or front side thereof; Fig. 2 is a sectional view thereof, taken through 2—2 of Fig. 1; Fig. 3 is a fragmentary front or top view of a vehicle steering wheel, with my knob means in connection therewith in a slightly modified form of construction, in which the knob forms an integral part of the rim of the wheel; Fig. 4 is a sectional view thereof, taken through 4—4 of Fig. 3, and Fig. 5 is a fragmentary edge view thereof, taken at 5—5 of Fig. 3.

Like characters of reference refer to similar parts and portions throughout the several views of the drawings.

The vehicle steering wheels now commonly in use, particularly on automobiles, consist of an annular gripping or rim portion 1, usually made of wood and secured at intervals to the outer ends of arms 2 radiating from a hub mounted on the steering post. At the upper side of the rim 1, or on the side thereof nearest the driver of the automobile, I have provided a plurality of knobs 3, which, as shown in Figs. 1 and 2 of the drawings, are rotatably mounted and secured in position thereon by means of screws 4. These knobs 3 are preferably flat and rounded in a manner to conform substantially with the hollow portion of the hand of the driver of the vehicle. Said knobs extend only a slight distance above the upper side of the rim 1 and are preferably of approximately the same width. The knobs described may be arranged in any suitable manner at the upper side of the rim or other portions of the steering wheel to suit the manifold whims of the various drivers. Fig. 1 shows these knobs positioned at diametrically opposite portions of the wheel at the lateral sides of the rim and also slightly offset from a line, parallel with the axis of the vehicle.

In the modified form of construction, shown in Figs. 3, 4 and 5 of the drawings, the knob members are non-rotatably secured to and form preferably an integral part of the rim of the wheel, as shown best in Figs. 4 and 5 of the drawings. In this modified form of construction, in which the knobs do not rotate with the hand when rotating the wheel, the knobs are preferably highly polished so that the hand slides readily over or around the same performing a similar function to that disclosed in connection with Figs. 1 and 2.

Thus it will be seen that a steering wheel of this class provided with substantially flat knobs at the upper side thereof may be readily and quickly rotated with one hand by placing the hollow portion of the hand over one of the knobs. With this construction the rim of the wheel may be easily gripped at the same time the hand is placed over one of the knobs, if desired, without interfering in any way with the usual function of the wheel.

Though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. A vehicle steering wheel provided at its one side with a relatively flat rounded knob adapted to conform with and extend into the palm of the hand of the person operating the wheel, the distance from the outer end of the knob to the back side of the wheel being such as to permit the fingers to grip the back side of the wheel while the palm of the hand rests on the outer end of the knob.

2. A vehicle steering wheel provided with an annular rim having relatively flat rounded knob means secured thereto and extending therefrom toward the driver of the vehicle, the distance from the outer end of the knob means to the back side of the annular rim being such as to permit the fingers of the hand operating the wheel to grip the back side of the rim while the palm of the hand rests on the outer end of the knob.

3. A vehicle steering wheel provided with an annular rim, and a knob secured to the upper side of said rim and extending a slight distance above the same, said knob being shaped to conform with the palm of a hand for rotating said wheel, said distance, together with the thickness of said rim, being considerably less than the distance between the outer edge of the palm and the ends of the fingers of an ordinary hand.

In testimony whereof, I have hereunto set my hand at San Diego, California, this 22nd day of May, 1925.

ARTHUR C. McBRIDE.